United States Patent
Hwang et al.

(10) Patent No.: US 10,999,391 B2
(45) Date of Patent: May 4, 2021

(54) DYNAMIC FILTERING AND AMELIORATION OF CONTENT STREAM MANIFESTS

(71) Applicant: Sony Interactive Entertainment LLC, San Mateo, CA (US)

(72) Inventors: Alexander Hwang, Orinda, CA (US); Joel Freeman, Sausalito, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 32 days.

(21) Appl. No.: 15/798,197

(22) Filed: Oct. 30, 2017

(65) Prior Publication Data

US 2019/0132409 A1    May 2, 2019

(51) Int. Cl.
*G06F 15/16*   (2006.01)
*H04L 29/08*   (2006.01)
*H04L 29/06*   (2006.01)

(52) U.S. Cl.
CPC ............ *H04L 67/28* (2013.01); *H04L 65/105* (2013.01); *H04L 65/1023* (2013.01); *H04L 65/4069* (2013.01); *H04L 65/4084* (2013.01); *H04L 67/02* (2013.01)

(58) Field of Classification Search
CPC ...... H04L 65/4069; H04L 67/02; H04L 67/28
USPC ...................................................... 709/219
See application file for complete search history.

(56) References Cited

U.S. PATENT DOCUMENTS

| | | | |
|---|---|---|---|
| 2009/0007093 A1* | 1/2009 | Lin | G06F 11/08 717/174 |
| 2016/0164761 A1* | 6/2016 | Sathyanarayana | H04L 65/60 709/219 |
| 2017/0272485 A1* | 9/2017 | Gordon | H04N 21/222 |

* cited by examiner

*Primary Examiner* — Normin Abedin
(74) *Attorney, Agent, or Firm* — Polsinelli LLP

(57) ABSTRACT

Systems and methods for dynamic filtering of content stream manifests are provided. Rules may be stored in memory of a proxy server regarding a plurality of different manifest inconsistencies. Each rule may associate a different manifest inconsistency with one or more indicators and a corresponding solution. One or more segments of a content stream may be provided between a content delivery network server and a client device. Such segments may be monitored by the proxy server, which may act as an intermediary between the content delivery network server and the client device. The proxy server may detect when a manifest of the monitored content stream exhibits one of the manifest inconsistencies based on the presence of the associated indicators. The solution corresponding to the exhibited manifest inconsistency may be identified based on the stored rule associated with the detected indicators. The retrieved solution may then be applied to the content stream, such that the exhibited manifest inconsistency is resolved before the monitored segments are delivered to the client device.

21 Claims, 3 Drawing Sheets

DYNAMIC FILTERING AND AMELIORATION OF CONTENT STREAM MANIFESTS

BACKGROUND OF THE INVENTION

1. Field of the Invention

The present invention generally relates to content streaming. More specifically, the present invention relates to dynamic filtering of content stream manifests.

2. Description of the Related Art

Presently available methods for adaptive content streaming over hypertext transfer protocol (HTTP) networks—such as the Internet—utilize a manifest (or playlist or index) file that contains metadata regarding the stream. HTTP Live Streaming (HLS), for example, is an example of such a streaming protocol that is commonly used on Apple® branded devices. HLS usage has gotten much more pervasive and is supported on virtually all streaming platforms. A content source, such as a content server, may make available a plurality of different alternate variants of the stream each encoded in different ways (e.g., different bit rates or quality levels). This feature of HLS may be referred to as adaptive bitrate or ABR. A client device streaming content from such a content source (e.g., web server) may switch between the alternate stream variants based on the level of resources currently available to that client device. A manifest file is provided to that client device that includes information regarding what streams are available, as well as the locations (e.g., identified by URLs) of the next segments of the streams.

The manifest file may be updated dynamically as network conditions (e.g., bandwidth) change and the content stream proceeds in sequence. Live streaming content, for example, must be refreshed at certain intervals, whereas recorded content (e.g., from DVR, VOD) may not require refresh. Such updates or refreshes allow the client device to switch seamlessly between the corresponding segments of the different available stream variants. In some circumstances, the content server may not always be able to provide the updates necessary to maintain an accurate manifest. As such, the manifest currently used by the client may be incomplete, inaccurate, timed-out, or otherwise defective. As a result of such unreliable manifest refreshes, the content stream to the client device may experience interruptions, slowdowns, loops, failures, or other quality-of-service issues.

Another type of manifest-related issue may arise due to inconsistencies between the sequence numbering and the manifest. The manifest may be incorrect, reflecting the wrong information or information that is inconsistent with a previous version of the manifest. In other cases, there may be gaps in the sequence numbering of the received segments. The manifest itself may be correct, but the client device may not be able to handle such gaps.

One difficulty with fixing such issues arising from inconsistent manifests is the impracticality of client-side implementation. Client devices may use multiple different media players associated with different platforms (e.g., Apple, Google, Adobe) to stream content from different sources. As such, there are a great number of different issues that may plague the network. Most client devices lack the processing capability to identify and fix manifest errors, in addition to handling their regular responsibilities and tasks.

There is, therefore, a need in the art for improved systems and methods for dynamic filtering of content stream manifests.

SUMMARY OF THE CLAIMED INVENTION

Embodiments of the present invention allow for dynamic filtering of content stream manifests. Rules may be stored in memory of a proxy server regarding a plurality of different manifest inconsistencies. Each rule may associate a different manifest inconsistency with one or more indicators and a corresponding solution. One or more segments of a content stream may be provided between a content delivery network server and a client device. Such segments may be monitored by the proxy server, which may act as an intermediary between the content delivery network server and the client device. The proxy server may detect when a manifest of the monitored content stream exhibits one of the manifest inconsistencies based on the presence of the associated indicators. The solution corresponding to the exhibited manifest inconsistency may be identified based on the stored rule associated with the detected indicators. The retrieved solution may then be applied to the content stream, such that the exhibited manifest inconsistency is resolved before the monitored segments are delivered to the client device.

Various embodiments of the present invention may include methods for dynamic filtering of content stream manifests. Such methods may include storing rules in memory of a database regarding a plurality of different manifest inconsistencies where each rule associates a different manifest inconsistency with one or more indicators and a corresponding solution, monitoring one or more segments of a content stream provided between a content delivery network server and a client device via a proxy server that acts as an intermediary between the content delivery network server and the client device, detecting when a manifest of the monitored content stream exhibits one of the manifest inconsistencies based on presence of the associated indicators, identifying the solution corresponding to the exhibited manifest inconsistency based on the stored rule associated with the detected indicators, and applying the retrieved solution to the content stream such that the exhibited manifest inconsistency is resolved before the monitored segments are delivered to the client device.

Further embodiments of the present invention may include systems for dynamic filtering of content stream manifests. Such systems may include a database that stores rules in memory regarding a plurality of different manifest inconsistencies where each rule associates a different manifest inconsistency with one or more indicators and a corresponding solution, and a proxy server that acts as an intermediary between a content delivery network server and a client device. The proxy server may executes instructions to monitor one or more segments of a content stream provided between the content delivery network server and the client device, detect when a manifest of the monitored content stream exhibits one of the manifest inconsistencies based on presence of the associated indicators, identify the solution corresponding to the exhibited manifest inconsistency based on the stored rule associated with the detected indicators, and apply the retrieved solution to the content stream such that the exhibited manifest inconsistency is resolved before the monitored segments are delivered to the client device.

Further embodiments include non-transitory computer-readable storage media having embodied thereon a program executable by a processor to perform a method for dynamic filtering of content stream manifests as described above.

BRIEF DESCRIPTIONS OF THE DRAWINGS

DETAILED DESCRIPTION

Embodiments of the present invention allow for dynamic filtering of content stream manifests. Rules may be stored in memory of a proxy server regarding a plurality of different manifest inconsistencies. Each rule may associate a different manifest inconsistency with one or more indicators and a corresponding solution. One or more segments of a content stream may be provided between a content delivery network server and a client device. Such segments may be monitored by the proxy server, which may act as an intermediary between the content delivery network server and the client device. The proxy server may detect when a manifest of the monitored content stream exhibits one of the manifest inconsistencies based on the presence of the associated indicators. The solution corresponding to the exhibited manifest inconsistency may be identified based on the stored rule associated with the detected indicators. The retrieved solution may then be applied to the content stream, such that the exhibited manifest inconsistency is resolved before the monitored segments are delivered to the client device. Compared to the prior art, such systems and methods reduce errors and improve the reliability and stability of content delivery systems by an order of magnitude without requiring resources from the content sources or the client device.

Figure 1:
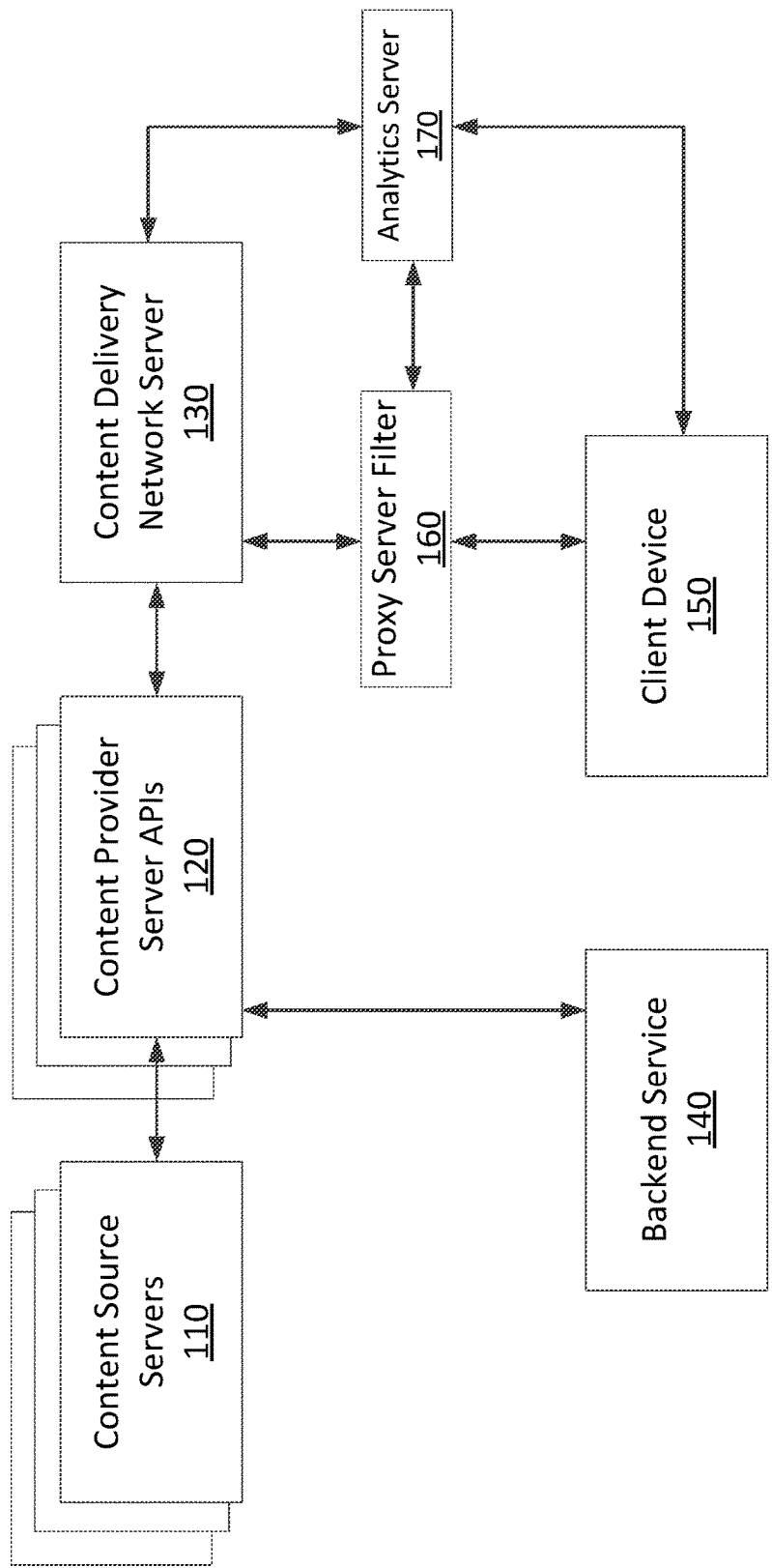
FIG. 1 illustrates a network environment in which a system for dynamic filtering of content stream manifests may be implemented.

FIG. 1 illustrates a network environment 100 in which a system for management of non-linear content presentation and experience may be implemented. The network environment 100 may include one or more content source servers 110 that provide streaming content (e.g., video) for distribution (e.g., via one or more video on-demand (VOD) services), one or more content provider server application program interfaces (APIs) 120, content delivery network server 130, a backend service layer 140, one or more client devices 150, a proxy server filter 160, and an analytics server 170.

Content source servers 110 may maintain and provide media titles available for streaming. Such media titles may include not only pre-recorded content (e.g., DVR content), but also streams of live broadcasts (e.g., live sporting events, live e-sporting events, breaking news, broadcast premieres, Facebook® Live, YouTube® Live). The content source servers 110 may be associated with any content provider that makes its content available to be streamed The streaming content from content source server 110 may be provided through a content provider server API 120, which allows various types of content sources server 110 to communicate with backend service layer 140. The content provider server API 120 may be specific to the particular language, operating system, protocols, etc. of the content source server 110 providing the streaming content. In a network environment 100 that includes multiple different types of content source servers 110, there may likewise be a corresponding number of content provider server APIs 120.

The content provider server API 120 therefore facilitates access of each of the client devices 150 to the content hosted by the content source servers 110. Additional information, such as metadata, about the accessed content can also be provided by the content provider server API 120 to the client device 150. As described below, the additional information (i.e. metadata) can be usable to provide details about the content being streamed to the client device 150. Finally, additional services associated with the accessed content such as chat services, ratings and profiles can also be provided from the content source servers 110 to the client device 150 via the content provider server API 120.

The content provider server API 120 can be accessed by a content delivery network server 130. The content delivery network server 130 may include a server that provides resources and files related to the streaming media, including promotional images and service configurations with client devices 150. The content delivery network server 130 can also be called upon by the client devices 150 that request to stream or subscribe to specific content.

The content provider server API 120 may communicate with a backend service layer 140 in order to process available streaming content for the client device 150. As described below, the additional information about the content may include metadata describing the available content (e.g., by author, title, genre). The information may also include a location where the content is stored (e.g., URL) so that the client device 150 can proceed with retrieving the content at the content source server 110. Furthermore, the metadata may include details about the content (e.g., author, title, genre), as well as instructions for implementing functionalities (e.g., chat) that would allow different client devices 150 to interact with each other. Such instructions may also be used by the backend service layer 140 to support certain functionalities for the client device 150.

The backend service layer 140 may be responsible for communicating with the different content source servers 110 in order to process that content for the client device 150. The backend service layer 140 may carry out instructions, for example, for identifying the format of a media title and formatting the media title so as to be playable on the client device 150. Such formatting may include identifying the metadata associated with each of the content, then using various different types of conversion techniques so that data stored in one format at the content source servers 110 may be rendered and displayed on the client devices 150, which may require a different format. As such, media titles of different formats may be made available so as to be compatible with client device 150 via the backend service layer 140.

1 The client device 150 may include a plurality of different types of computing devices. For example, the client device 150 may include any number of different gaming consoles, mobile devices, laptops, and desktops. Such client devices 150 may also be configured to access data from other storage media, such as, but not limited to memory cards or disk drives as may be appropriate in the case of downloaded services. Such devices 150 may include standard hardware computing components such as, but not limited to network and media interfaces, non-transitory computer-readable storage (memory), and processors for executing instructions that may be stored in memory. These client devices 150 may also run using a variety of different operating systems (e.g., iOS, Android), applications or computing languages (e.g., C++, JavaScript). An exemplary client device 150 is described in detail herein with respect to FIG. 3.

Proxy server filter 160 and analytics server 170 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

In an exemplary implementation of the present invention, client device 150 may request content from one of the content source servers 110. Such content may have been processed into a variety of different formats by content provider APIs 120 and backend service 140 and then provided to content delivery network server 130 for distribution. As a result, there may be a variety of different formats and bit rates available to stream to the client device 150. Based on the resources (e.g., bandwidth) available to the client device 150 at any given moment, different types of streams may be selected. Further, a selected type of stream may be switched mid-stream based on changing conditions in the network. A manifest associated with the content stream is used to track information (e.g., number of the segment within a sequence) regarding the segments of the stream being provided to the client device 150. Because conditions and the type of stream may change during the course of the stream, the manifest may require continuous refreshing to reflect the relevant information. When there is an error or defect in a current version of manifest, the client device 150 may experience problems with the content stream. For example, all bit rate variants of a content stream must be synchronizable. Inconsistent info (e.g., due to delivery error) can make the content unsynchronizable, thus leading to playback failure during a bit rate switch.

Proxy server filter 160—which may act as an intermediary between the content delivery network server 130 and the client device 150—is therefore provided to monitor segments of the stream for various errors and defects involving the manifest, as well as fixes the same before the segments are delivered to the client device 150. Inconsistencies in the manifest may be defined by rules that are stored in a database.

One type of manifest inconsistency may arise where a refreshed version of the manifest is incomplete, such that the client device 150 does not receive the remainder of the information necessary to maintain the content stream in a reliable manner. Another type of inconsistency may occur when the sequence number of a segment erroneously appears to have rolled back to a number that comes before the number of the previously received segment received at the client device 150. Such an instance may result in the display of content that had already been shown. Further, the stream at the client device 150 may become stuck (e.g., crash).

Another type of manifest inconsistency may relate to jumps in segment sequencing. One of the reasons for such inconsistencies is that in a large streaming system, content streams are generated and replicated by multiple servers. Such servers can fail on a particular piece of a content stream that is not in a synchronized fashion. This dis-synchronization is often accumulative, as it is apparently difficult to require such large-scale live streaming systems to deliver flawless content. Thus, inconsistent content generation and delivery may result. Some client devices 150 may not be able to handle such jumps, thereby resulting in failure (e.g. crash, loop around) of the stream. It may also be impractical to require all media players to be resilient to all inconsistencies. The manifest itself may reflect correct information, but the sequence numbering of the segments may not match up. In order to address this issue, the number(s) of the affected segment(s) may need to be adjusted back so as to fall within a neighborhood or range acceptable to the client device 150. Other exemplary manifest inconsistencies may include the wrong manifest (e.g., associated with a different content stream), an error in the sequence of numbers associated with the monitored segments, or an error in a timestamp associated with at least one of the monitored segments.

As a result of such manifest inconsistencies, the wrong content (e.g., advertisements) or wrong portions of content may be displayed at the client device 150. For example, an earlier version of the manifest associated with one advertisement may initially be provided to the client device 150, but a refreshed version with the wrong sequence number may provide a different advertisement to the client device 150. Such a result not only ruins the experience of the user of the client device 150 watching the streamed content, but deprives the advertisers of the benefits for which they paid, and further affect revenue of various content developers and distributors.

Each rule stored in the database of proxy server filter 160 may associate a specified manifest inconsistency with one or more indicators and a corresponding solution. Over time, the database may receive one or more updates to the stored rules for application by the proxy server filter 160. By applying the rules to the segments of the content stream, proxy server filter 160 may detect when a manifest of the monitored content stream exhibits one of the manifest inconsistencies based on the presence of the associated indicators. In some embodiments, the proxy server filter 160 may monitor a plurality of streams, including streams to other client devices. Some systems may also use multiple proxy server filters 160 to monitor multiple streams to various client devices.

The type of indicators detected may be compared to the rules to determine whether there is a match. A rule for incomplete manifests, for example, may specify that certain information must be present, and the lack thereof may be an indicator of an incomplete manifest. Similarly, a rule for segment numbering may specify that the numbered segments be received in sequence, and an out-of-order segment may be an indicator of the same. As the manifest refreshes and the content stream segments are monitored by proxy server filter 160, such indicators may be detected.

Upon detection of the exhibited manifest inconsistency, the proxy server filter 160 may then identify the solution corresponding to the exhibited manifest inconsistency based on the stored rule associated with the detected indicators. The solution may then be applied to the content stream by the proxy server filter 160 so as to resolve the same before the segments are delivered to the client device 150. Application of the solution may involve retrieving specialized instructions stored in memory for execution by the proxy server filter 160. Depending on what manifest inconsistency is detected, the solution may include modifying one or more characteristics of the refreshed manifest, fixing a pointer in the refreshed manifest, discarding the refreshed manifest, rolling back to a previous version of the manifest before the refresh, waiting until the manifest is refreshed again, and using the re-refreshed manifest, placing a hold on a current segment of the content stream so as to advance to a current number in the sequence, waiting until a next frame in the content stream is received, adjusting one or more of the sequence of numbers associated with the monitored segments, or replacing the current segment in the content stream with a default placeholder segment.

The proxy server may also maintain a log regarding the manifest and the segments of the content stream, including information regarding a plurality of refreshed versions of the manifest. Such a log may be provided to analytics server 170 for analysis directed at flagging new, previously unknown issues in the content stream. Such flagged issues may be indicative of new types of manifest inconsistencies, and as such, may be provided to a designated recipient for further evaluation.

The proxy server may further be used to collect detailed playlist information and to fetch latency information. Further, the proxy server may be used to bridge protocol gaps, such as may arise when certain HLS players are unable to handle certain HLS protocol versions. In comparison to prior art implementations utilizing centralized backend servers, the proxy server may provide faster performance and micro-customization due to location-specific configuration and deployment.

Figure 2:
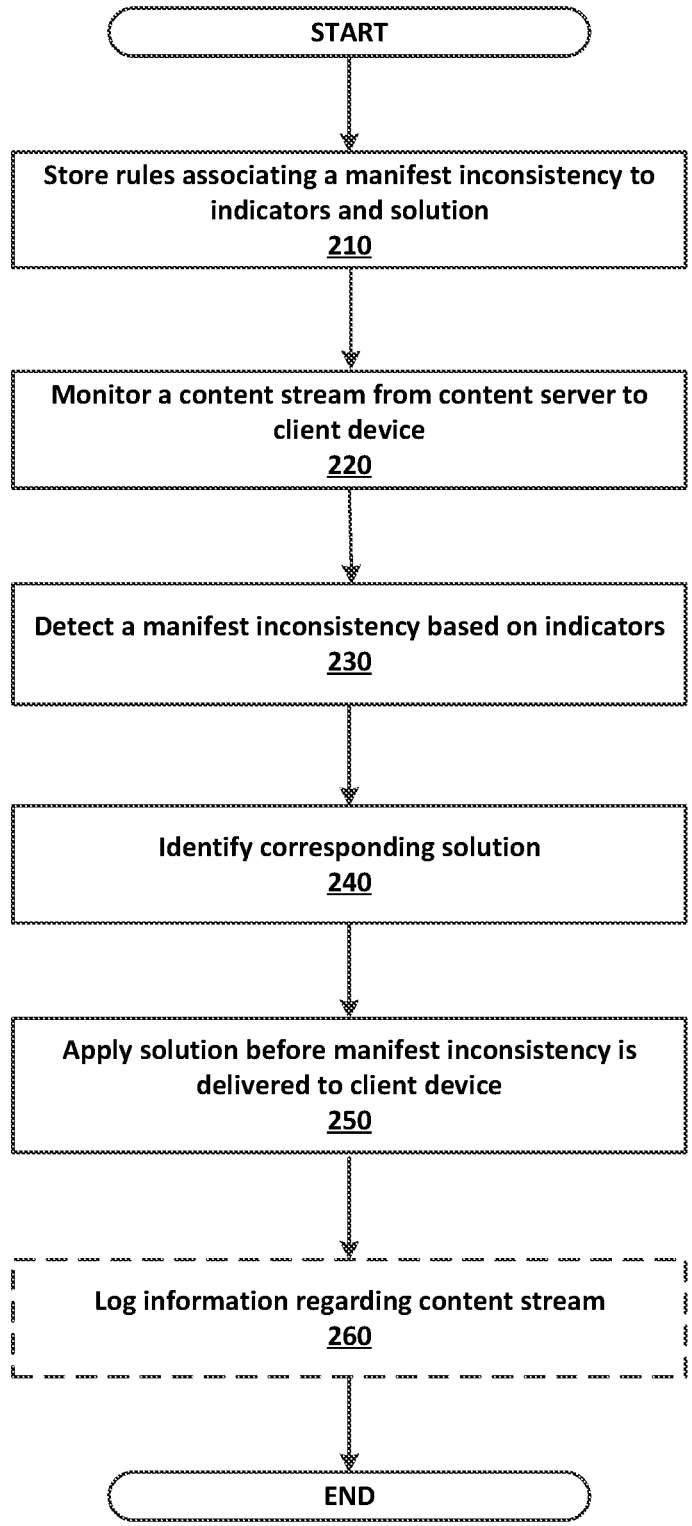
FIG. 2 is a flowchart illustrating an exemplary method for dynamic filtering of content stream manifests.

FIG. 2 illustrates a method 200 for dynamic filtering of content stream manifests. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, rules may be stored in memory of a proxy server regarding a plurality of different manifest inconsistencies. Each rule may associate a different manifest inconsistency with one or more indicators and a corresponding solution. One or more segments of a content stream may be provided between a content delivery network server and a client device. Such segments may be monitored by the proxy server, which may act as an intermediary between the content delivery network server and the client device. The proxy server may detect when a manifest of the monitored content stream exhibits one of the manifest inconsistencies based on the presence of the associated indicators. The solution corresponding to the exhibited manifest inconsistency may be identified based on the stored rule associated with the detected indicators. The retrieved solution may then be applied to the content stream, such that the exhibited manifest inconsistency is resolved before the monitored segments are delivered to the client device. Information regarding the In step 210, rules are stored in a database at the proxy server filter 160. Such rules define certain manifest inconsistencies that may be present in relation to a content stream and segments thereof. For each manifest inconsistency, the rules may further associate a set of one or more indicators with a specified solution to fix the manifest inconsistency. The database may be updated over time with new rules as new manifest inconsistencies may be identified and solutions may be found for the same.

In step 220, a content stream from content delivery network server 150 to client device 150 may be monitored by the proxy server filter 160. The content stream may comprise a plurality of segments and may be available in different types. The proxy server filter 160 may evaluate the segments as they are streamed to the client device 150 to detect whether they—and the manifest associated with the stream—may exhibit any of the manifest inconsistencies defined by the rules.

In step 230, proxy server filter 160 may detect the indicators associated with a specific manifest inconsistency. Such indicators may be determined to match one of the rules stored in the database. Depending on the type of manifest inconsistency, there may be one or more indicators that determine whether such manifest inconsistency is determined to be present. When the indicator(s) associated with a specified manifest inconsistency in accordance with a matching rule, that specified manifest inconsistency In step 240, the corresponding solution to the manifest inconsistency is identified based on the matching rule, and in step 250, the solution specified by the matching rule is applied. Depending on the particular manifest inconsistency, the solution may be one of a variety of actions. The rules database may further store a set of instructions executable by the proxy server filter 160 to execute one or more actions required to remedy the content stream—whether by modifying the manifest or the segments—before the segments and manifest are provided to the client device 150.

In step 260, information may be logged regarding the content stream. Such a log may be provided to the analytics filter 170 for analysis with respect to identifying possible new manifest inconsistencies that may arise in relation to the content stream.

Figure 3:
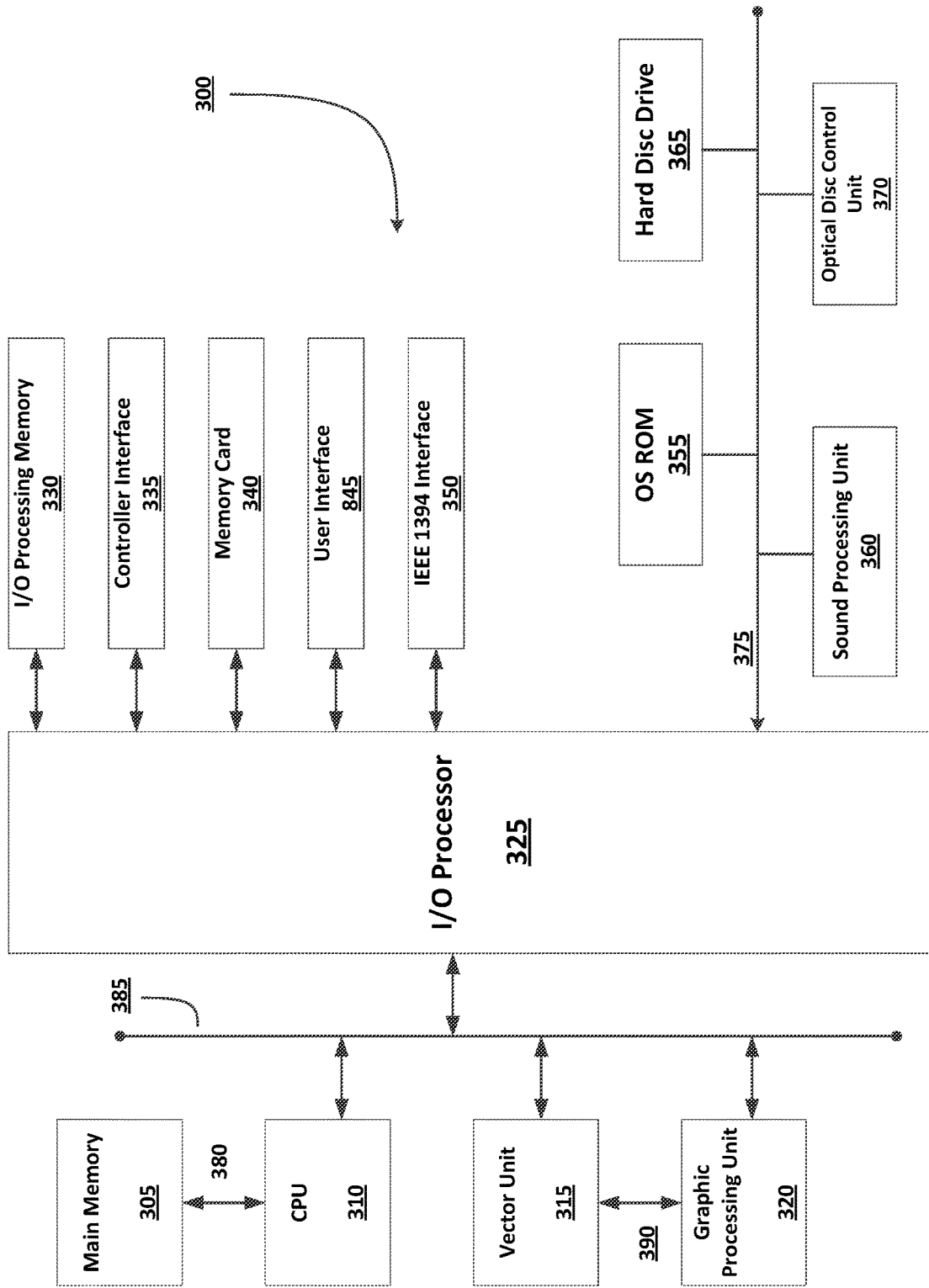
FIG. 3 is an exemplary electronic entertainment system that may be used in dynamic filtering of content stream manifests.

FIG. 3 is an exemplary electronic entertainment system that may be used in dynamic filtering of content stream manifests. The entertainment system 300 of FIG. 3 includes a main memory 305, a central processing unit (CPU) 310, vector unit 315, a graphics processing unit 320, an input/output (I/O) processor 325, an I/O processor memory 330, a controller interface 335, a memory card 340, a Universal Serial Bus (USB) interface 345, and an IEEE 1394 interface 350. The entertainment system 300 further includes an operating system read-only memory (OS ROM) 355, a sound processing unit 360, an optical disc control unit 370, and a hard disc drive 365, which are connected via a bus 375 to the I/O processor 325.

Entertainment system 300 may be an electronic game console. Alternatively, the entertainment system 300 may be implemented as a general-purpose computer, a set-top box, a hand-held game device, a tablet computing device, or a mobile computing device or phone. Entertainment systems may contain more or less operating components depending on a particular form factor, purpose, or design.

The CPU 310, the vector unit 315, the graphics processing unit 320, and the I/O processor 325 of FIG. 3 communicate via a system bus 385. Further, the CPU 310 of FIG. 3 communicates with the main memory 305 via a dedicated bus 380, while the vector unit 315 and the graphics processing unit 320 may communicate through a dedicated bus 390. The CPU 310 of FIG. 3 executes programs stored in the OS ROM 355 and the main memory 305. The main memory 305 of FIG. 3 may contain pre-stored programs and programs transferred through the I/O Processor 325 from a CD-ROM, DVD-ROM, or other optical disc (not shown) using the optical disc control unit 370. I/O Processor 325 of FIG. 3 may also allow for the introduction of content transferred over a wireless or other communications network (e.g., 4G, LTE, 1G, and so forth). The I/O processor 325 of FIG. 3 primarily controls data exchanges between the various devices of the entertainment system 300 including the CPU 310, the vector unit 315, the graphics processing unit 320, and the controller interface 335.

The graphics processing unit 320 of FIG. 3 executes graphics instructions received from the CPU 310 and the vector unit 315 to produce images for display on a display device (not shown). For example, the vector unit 315 of FIG. 3 may transform objects from three-dimensional coordinates to two-dimensional coordinates, and send the two-dimensional coordinates to the graphics processing unit 320. Furthermore, the sound processing unit 360 executes instructions to produce sound signals that are outputted to an audio device such as speakers (not shown). Other devices may be connected to the entertainment system 300 via the USB interface 345, and the IEEE 1394 interface 350 such as wireless transceivers, which may also be embedded in the system 300 or as a part of some other component such as a processor.

A user of the entertainment system 300 of FIG. 3 provides instructions via the controller interface 335 to the CPU 310. For example, the user may instruct the CPU 310 to store certain game information on the memory card 340 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for dynamic filtering of content stream manifests, the system comprising:
   a database in memory that stores rules regarding a plurality of different manifest inconsistencies each associated with a plurality of indicators, wherein each rule specifies that the one or more indicators are associated with a set of instructions executable to apply a corresponding solution to the associated manifest inconsistency; and
   a proxy server that acts as an intermediary between a content delivery network server and a client device, wherein the proxy server executes instructions stored in memory, and wherein execution of the instructions:
      monitors one or more segments of a content stream provided between the content delivery network server and the client device, wherein the segments are monitored for presence of the indicators associated with the rules,
      detects that a manifest of the content stream exhibits one or more of indicators that match the indicators associated with an identified one of the rules,
      identifies that the manifest exhibits one of the manifest inconsistencies based on the indicators detected in the manifest matching the indicators specified by the identified rule,
      retrieves the set of instructions executable to apply the corresponding solution as specified by the identified rule, and
      executing the retrieved set of instructions, wherein execution of the retrieved set of instructions modifies the manifest of the content stream in accordance with the corresponding solution as specified by the identified rule, wherein modifying the manifest in accordance with the identified rule resolves the exhibited manifest inconsistency before the segments of the content stream are delivered to the client device.

2. The system of claim 1, wherein the detected manifest inconsistency includes a defect in a refreshed version of the manifest, and wherein the rules specify indicators for at least one of:
   an incomplete version of the manifest;
   a different manifest that is associated with a different content stream;
   an older version of the manifest as part of the refresh subsequent to receipt of a newer version of the manifest;
   an error in a sequence of numbers associated with the monitored segments;
   an error in a timestamp associated with at least one of the monitored segments; and
   incompatible HLS protocol version conversion.

3. The system of claim 2, wherein the set of instructions executed by the proxy server include instructions executable to perform at least one of:
   modifying one or more characteristics of the refreshed manifest version;
   fixing a pointer in the refreshed manifest version;
   discarding the refreshed manifest version;

rolling back to a previous version of the manifest before the refresh;
waiting until the manifest is refreshed again, and using the re-refreshed manifest version;
placing a hold on a current segment of the content stream, wherein the hold advances a current number in the sequence;
waiting until a next frame in the content stream is received;
adjusting one or more of the sequence of numbers associated with the monitored segments; and
replacing the current segment in the content stream with a default placeholder segment.

4. The system of claim 1, wherein the proxy server maintains a log regarding the manifest and the segments of the content stream, and wherein the log further includes information regarding a plurality of refreshed versions of the manifest.

5. The system of claim 4, further comprising an analytics server, wherein the proxy server provides the log to the analytics server for analysis.

6. The system of claim 5, wherein the analytics server identifies a new type of manifest inconsistency based on the log and generates a flag to a designated recipient regarding the new type of manifest inconsistency.

7. The system of claim 6, wherein the new type of manifest inconsistency is included in an update to the stored rules, and wherein the update is applied to a subsequent content stream.

8. The system of claim 1, wherein the database further receives one or more updates to the stored rules, and stores the updates in the memory, wherein the updates are applied to a subsequent content stream.

9. The system of claim 1, wherein the proxy server monitors at least one other content stream provided to another client device.

10. The system of claim 1, further comprising another proxy server that monitors at least one other content stream provided to another client device.

11. The system of claim 1, wherein the content stream is among a plurality of content streams monitored by the proxy server, the plurality of content streams from a plurality of different content sources.

12. The system of claim 1, wherein the proxy server applies the stored rules in accordance with a location-specific configuration.

13. A method for dynamic filtering of content stream manifests, the method comprising:
storing in memory of a database rules regarding a plurality of different manifest inconsistencies each associated with a plurality of indicators, wherein each rule specifies that the one or more indicators are associated with a set of instructions executable to apply a corresponding solution to the associated manifest inconsistency;
monitoring one or more segments of a content stream provided between a content delivery network server and a client device via a proxy server, wherein the proxy server is an intermediary between the content delivery network server and the client device, and wherein the segments are monitored for presence of the indicators associated with the rules;
detecting that a manifest of the content stream exhibits one or more of indicators that match the indicators associated with an identified one of the rules;
identifying that the manifest exhibits one of the manifest inconsistencies based on the indicators detected in the manifest matching the indicators specified by the identified rule;
retrieving the set of instructions executable to apply the corresponding solution as specified by the identified rule; and
executing the retrieved set of instructions, wherein execution of the retrieved set of instructions modifies the manifest of the content stream in accordance with the corresponding solution as specified by the identified rule, wherein modifying the manifest in accordance with the identified rule resolves the exhibited manifest inconsistency before the segments of the content stream are delivered to the client device.

14. The method of claim 13, wherein the detected manifest inconsistency includes a defect in a refreshed version of the manifest, and wherein the rules specify indicators for at least one of:
an incomplete version of the manifest;
a different manifest that is associated with a different content stream;
an older version of the manifest as part of the refresh subsequent to receipt of a newer version of the manifest;
an error in a sequence of numbers associated with the monitored segments,
an error in a timestamp associated with at least one of the monitored segments; and
incompatible HLS protocol version conversion.

15. The method of claim 14, wherein the set of instructions include instructions executable to perform at least one of:
modifying one or more characteristics of the refreshed manifest version;
fixing a pointer in the refreshed manifest version;
discarding the refreshed manifest version;
rolling back to a previous version of the manifest before the refresh;
waiting until the manifest is refreshed again, and using the re-refreshed manifest version;
placing a hold on a current segment of the content stream, wherein the hold advances a current number in the sequence;
waiting until a next frame in the content stream is received;
adjusting one or more of the sequence of numbers associated with the monitored segments; and
replacing the current segment in the content stream with a default placeholder segment.

16. The method of claim 13, further comprising maintaining a log regarding the manifest and the segments of the content stream, wherein the log further includes information regarding a plurality of refreshed versions of the manifest.

17. The method of claim 16, further comprising providing the log to an analytics server, and analyzing the log at the analytics server.

18. The method of claim 13, further comprising receiving one or more updates to the stored rules, and storing the updates in the memory of the proxy server, wherein the updates are applied to a subsequent content stream.

19. The method of claim 13, further comprising monitoring at least one other content stream provided to another client device via the proxy server.

20. The method of claim 13, further comprising monitoring at least one other content stream provided to another client device via another proxy server.

21. A non-transitory computer-readable storage medium, having embodied thereon a program executable by a processor to perform a method for dynamic filtering of content stream manifests, the method comprising:

storing in memory of a database rules regarding a plurality of different manifest inconsistencies each associated with a plurality of indicators, wherein each rule specifies that the one or more indicators are associated with a set of instructions executable to apply a corresponding solution to the associated manifest inconsistency;

monitoring one or more segments of a content stream provided between a content delivery network server and a client device via a proxy server, wherein the proxy server is an intermediary between the content delivery network server and the client device, and wherein the segments are monitored for presence of the indicators associated with the rules;

detecting that a manifest of the content stream exhibits one or more of indicators that match the indicators associated with an identified one of the rules;

identifying that the manifest exhibits one of the manifest inconsistencies based on the indicators detected in the manifest matching the indicators specified by the identified rule;

retrieving the set of instructions executable to apply the corresponding solution as specified by the identified rule; and executing the retrieved set of instructions, wherein execution of the retrieved set of instructions modifies the manifest of the content stream in accordance with the corresponding solution as specified by the identified rule, wherein modifying the manifest in accordance with the identified rule resolves the exhibited manifest inconsistency before the segments of the content stream are delivered to the client device.

* * * * *